A. T. De PUY.
PRINTERS' CASE.
No. 6,801. Reissued Dec. 14, 1875.
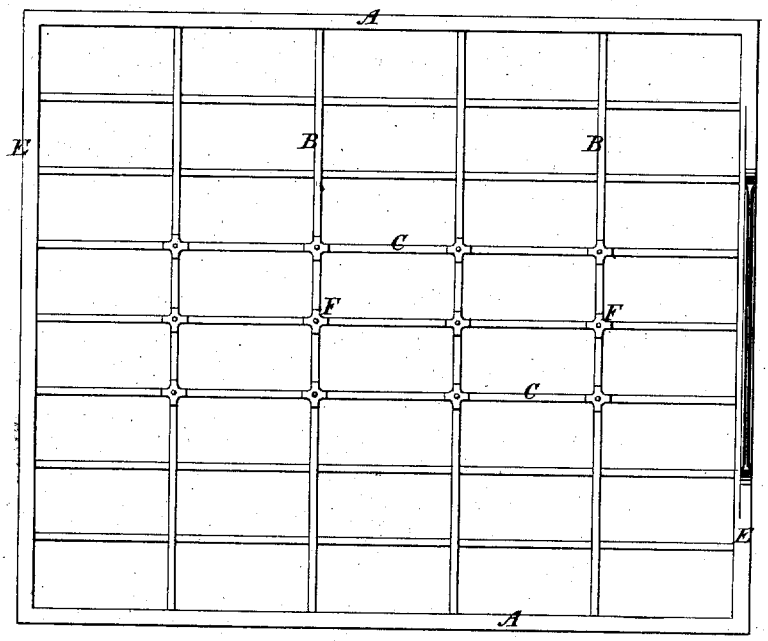
FIG. 1.
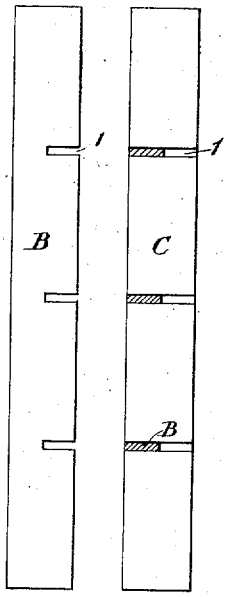
FIG. 5.
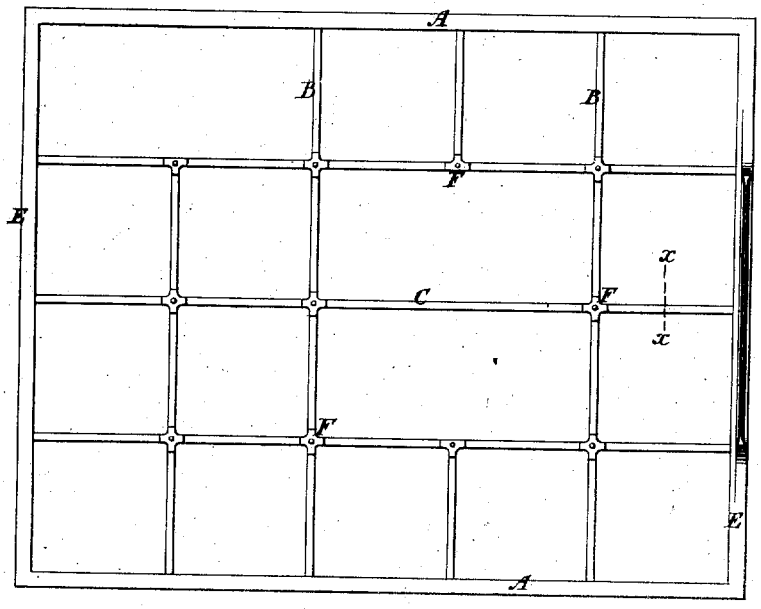
FIG. 2.
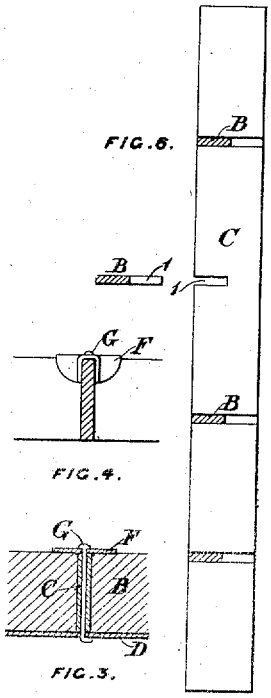
FIG. 6.
FIG. 4.
FIG. 3.
WITNESSES
Emil Lilienthal
George Robart.
INVENTOR
Alexander T. De Puy
by Munson & Philipp
Attorneys.

UNITED STATES PATENT OFFICE.

ALEXANDER T. DE PUY, OF NEW YORK, N. Y., ASSIGNOR TO R. HOE & CO., OF SAME PLACE.

IMPROVEMENT IN PRINTERS' CASES.

Specification forming part of Letters Patent No. 114,273, dated May 2, 1871; reissue No. 6,801, dated December 14, 1875; application filed November 24, 1875.

*To all whom it may concern:*

Be it known that I, ALEXANDER T. DE PUY, of the city, county, and State of New York, have invented a new and useful Improvement in Type-Cases, of which the following is a specification:

In the drawings forming a part of this description and specification, wherein like letters refer to like parts, Figure 1 is a view of an "upper case" made in accordance with this invention. Fig. 2 is a view of a "lower case" embodying this invention. Fig. 3 is a sectional view taken through one of the longitudinal partitions; Fig. 4, a similar view taken on the line *x* of Fig. 2, and Figs. 5 and 6 are views of the partitions detached from the case.

As at present constructed, the wooden strips forming the longitudinal and transverse partitions which divide a type-case into boxes, and constitute its filling, are held together at the points where they intersect each other by the following means: Each partition-strip has slots of a width equal to the thickness of the strips cut in them, which slots extend from one edge of the strip to its center. Strips thus prepared are entered upon each other by means of these slots, so that the whole parts of one strip enter the slot in the other, and two are thus locked together, and extended at right angles to each other. The required number of strips are thus locked together, and the position of their intersections determines the size of the type-boxes. As thus constructed, it is manifest that one strip at each intersection of two of them must be divided at its upper edge, which division extends downward to a distance equal to one-half the height of the partition it forms. One strip is thus weakened at its upper edge at each of the corners of the type-boxes, and is liable to be broken when the case is put into use. This construction is illustrated in Figs. 5 and 6, where C represents the transverse strips, and B the longitudinal strips.

The object of my invention is to provide the intersecting parts of the partition-strips of such cases with a means of union which shall securely unite, tie, brace, or hold the same; and to that end it consists in a metallic brace, tie, clamp, or clasp adapted for attachment to the severed part or parts of a wooden partition or dividing-strip of a type-case, so as to firmly unite the same to the unbroken portion of another partition, where two intersect or cross each other.

The said device is shown in the drawing as applied to a type-case composed of the usual border-frame, mortised or dovetailed at its corners, and provided with a bottom, D, and longitudinal and transverse partitions or dividing-strips B and C constituting its filling. The said partitions or strips, provided with slots 1 at proper distances apart, as in Figs. 5 and 6, are joined together by being inserted one into the other, as before explained. These partitions may extend from one side frame E to the other, and from one end frame A to the other, to form a set of equal-sized boxes, as in Fig. 1, which illustrates an upper case; or they may extend in either direction from the outer frame, or any one of the strips or partitions dividing it, to and terminate at any other of the strips or partitions, thus forming boxes of unequal size, as in Fig. 2, which illustrates a lower case. The joints formed by the intersecting of these strips or partitions are provided with a metallic tie, brace, clamp, or clasp, F, secured to the partitions by any means of fastening. Where the crossing of these strips or partitions forms four right angles the tie, brace, clamp, or clasp may be cruciform, and attached to the partitions by any means of union which will securely hold it engaged therewith. The means shown in the drawing are ears or lugs 2, which extend downward, as in Fig. 4, to embrace the sides thereof; and in order to retain it firmly in place the fastening, tie, brace, clamp, or clasp is secured by a nail, G, passing through it, the partitions, and the bottom of the case, against which its end is turned and clinched, thus drawing the parts well together, and holding them in place. Thus constructed, the ears 2 of the metallic fastener will brace one strip against the other, and prevent lateral displacement of either.

Where a partition extending in one direction is stopped at its intersection with one extending in the opposite direction, as in Fig. 2, thus forming but two right angles, the fastener is of such form as to secure the two firmly together, being fastened to the unbroken strip, and provided with an arm, which engages with the end of the severed strip, thus bracing the same, so as to prevent its lateral movement. The metallic fastening is of a shape to adapt it to engage the partitions, or parts of partitions which it is to tie, brace, or clamp, the requisite being that it shall engage with the part or parts of the partition which are free at their upper or exposed edges, by reason of the slots which sever them, and unite or connect one with the other, or one or both to the unbroken part of one partition which the severed parts of another partition embrace, and thus form a tie which shall bind the two together; and in order that the tie, brace, clamp, or clasp shall be held to this duty, and the filling be held close upon the bottom of the case, the nails G are provided, as before explained.

The difficulties heretofore attending the use of a type-case constructed in the common manner are entirely overcome by the present improvement, which can be readily applied with advantage to any of the type-cases now in use.

What I claim is—

1. A type-case the partitions of which are secured at their points of intersection by means of metallic ties, braces, clamps, or clasps, substantially as shown and described.

2. A metallic tie, brace, clamp, or clasp, for united the severed parts of intersecting partitions of a type-case, which is constructed so as to engage with the free part of one partition and secure it to the unbroken part of another partition, substantially as shown and described.

3. The combination of a metal tie, brace, clamp, or clasp, having one or more branches or arms adapted to engage with the free part or parts of a partition of a type-case, with a nail, for securing it to the solid or unbroken part of an intersecting partition, substantially as shown and described.

4. The metal fastening for securing the joints formed by intersecting partitions of a type-case constructed with depending ledges, whereby it is adapted to engage with the said partitions, substantially as shown and described.

In testimony whereof I have hereunto set my hand in the presence of two subscribing witnesses.

ALEXANDER T. DE PUY.

Witnesses:

W. H. BENNETT,

JOHN C. FOSTER, Jr.